(12) United States Patent
Adibowo

(10) Patent No.: US 11,042,562 B2
(45) Date of Patent: Jun. 22, 2021

(54) SCALABLE DATA EXTRACTOR

(71) Applicant: SAP SE, Walldorf (DE)

(72) Inventor: Sasmito Adibowo, Singapore (SG)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 16/599,197

(22) Filed: Oct. 11, 2019

(65) Prior Publication Data

US 2021/0109944 A1    Apr. 15, 2021

(51) Int. Cl.
*G06F 17/00*   (2019.01)
*G06F 16/25*   (2019.01)
*G06F 16/2458* (2019.01)

(52) U.S. Cl.
CPC ........ *G06F 16/254* (2019.01); *G06F 16/2471* (2019.01)

(58) Field of Classification Search
CPC ........ G06F 16/13; G06F 16/24; G06F 16/156; G06F 16/283; G06N 3/00; G06N 5/00; G05B 13/00
See application file for complete search history.

(56) References Cited

U.S. PATENT DOCUMENTS

| | | | | |
|---|---|---|---|---|
| 2011/0258182 A1* | 10/2011 | Singh | ................... | G06K 9/48 707/723 |
| 2015/0100326 A1 | 4/2015 | Kowalkiewicz et al. | | |
| 2015/0100382 A1 | 4/2015 | Malhotra et al. | | |
| 2015/0176997 A1 | 6/2015 | Pursche et al. | | |
| 2015/0269642 A1 | 9/2015 | Cai et al. | | |
| 2015/0381937 A1 | 12/2015 | Adibowo | | |
| 2016/0171505 A1 | 6/2016 | Johri et al. | | |
| 2016/0226944 A1* | 8/2016 | Hsiao | ................... | H04L 43/028 |
| 2016/0314175 A1 | 10/2016 | Dhayapule et al. | | |
| 2017/0116283 A1* | 4/2017 | Park | ................... | G06F 16/24568 |
| 2017/0223003 A1* | 8/2017 | Miles | ................... | G06F 21/6254 |
| 2017/0366580 A1* | 12/2017 | Ylonen | ................... | H04L 9/321 |
| 2018/0060953 A1 | 3/2018 | Adibowo | | |
| 2018/0240038 A1 | 8/2018 | Adibowo | | |

(Continued)

OTHER PUBLICATIONS

Aria2.github.io [online], "Aria2 Project: aria2c(1)" Oct. 2019, [retrieved on Dec. 10, 2020], retrieved from: URL <https://aria2.github.io/manual/en/html/>, 67 pages.

(Continued)

*Primary Examiner* — Hung D Le
(74) *Attorney, Agent, or Firm* — Fish & Richardson P.C.

(57) ABSTRACT

Methods, systems, and computer-readable storage media for determining, by an extraction worker of a data extraction system, a number of pages based on data that is to be extracted from the source system, for each page, by a respective extraction worker: querying the source system, and storing a query result in a respective page file within a staging data file system of the data extraction system, for each extraction worker that queries the source system, verifying a status of the extraction worker after expiration of a predetermined delay time based on a timestamp of the page that the extraction worker is handling, and determining that a page status for each page is completed, and in response, posting an extraction completed message to inform the consuming system that the data has been extracted from the source system.

20 Claims, 10 Drawing Sheets

(56) References Cited

U.S. PATENT DOCUMENTS

2018/0260693 A1 9/2018 Dahlmeier et al.
2019/0087239 A1 3/2019 Adibowo

OTHER PUBLICATIONS

Docs.Oracle.com [online], "Oracle GoldenGate Administration Guide, Passage" Oct. 2009, [retrieved on Dec. 10, 2020], retrieved from: URL <http://docs.oracle.com/cd/EI5881 01/doc.104/gg wux admin v104>, 59 pages.
Extended European Search Report issued in European Application No. 20197326.0 dated Dec. 18, 2020, 8 pages.
Github.com [online], "Aria2 Project: Releases" Oct. 2019, [retrieved on Dec. 10, 2020], retrieved from: URL <https://github.com/aria2/aria2/releases>, 13 pages.
U.S. Appl. No. 16/170,183, filed Oct. 25, 2018, Adibowo.
U.S. Appl. No. 16/183,441, filed Nov. 7, 2018, Adibowo.
U.S. Appl. No. 16/435,708, filed Jun. 10, 2019, Adibowo.
Wikipedia contributors, "Representational state transfer." Wikipedia, The Free Encyclopedia, created on Aug. 17, 2004, [Retrieved on Jun. 24, 2019], retrieved from: URL <https://en.wikipedia.org/wiki/Representational_state_transfer>, 13 pages.
Wikipedia contributors, "Open Data Protocol." Wikipedia, The Free Encyclopedia, created on Mar. 21, 2010, [retrieved on Jun. 24, 2019], retrieved from: URL <https://en.wikipedia.org/wiki/Open_Data_Protocol>, 11 pages.
Wikipedia contributors,"I/O bound." Wikipedia, The Free Encyclopedia, created on May 11, 2004, [retrieved on Jun. 24, 2019], retrieved from: URL <https://en.wikipedia.org/wiki/I/O_bound>, 3 pages.
Wikipedia contributors, "Extract, transform, load." Wikipedia, The Free Encyclopedia, created on Jun. 3, 2003, [retrieved on Jun. 24, 2019], retrieved from: URL <https://en.wikipedia.org/wiki/Extract_transform,_load>, 16 pages.
Wikipedia contributors, "Cloud computing." Wikipedia, The Free Encyclopedia, created on Mar. 3, 2007, [retrieved on Jun. 24, 2019], retrieved from: URL <https://en.wikipedia.org/wiki/Cloud_computing>, 41 pages.
Wikipedia contributors, "Infrastructure as a service." Wikipedia, The Free Encyclopedia, created on Jul. 5, 2007, [retrieved on Jun. 24, 2019], retrieved from: URL <https://en.wikipedia.org/wiki/Infrastructure_as_a_service>, 5 pages.
Wikipedia contributors, "Happy path." Wikipedia, The Free Encyclopedia, created on Feb. 6, 2007 [retrieved on Jun. 24, 2019], retrieved from: URL <https://en.wikipedia.org/wiki/Happy_path>, 2 pages.
Wikipedia contributors, "Platform as a service." Wikipedia, The Free Encyclopedia, created on Apr. 18, 2008, [retrieved on Jun. 24, 2019], retrieved from: URL <https://en.wikipedia.org/wiki/Platform_as_a_service>, 10 pages.
Wikipedia contributors, "Instruction cycle." Wikipedia, The Free Encyclopedia, created on Apr. 4, 2004, [retrieved on Jun. 24, 2019], retrieved from: URL <https://en.wikipedia.org/wiki/Instruction_cycle>, 10 pages.
Wikipedia contributors, "Cloud Foundry." Wikipedia, The Free Encyclopedia, created on Apr. 13, 2011, [retrieved on Jun. 24, 2019], retrieved from: URL <https://en.wikipedia.org/wiki/Cloud_Foundry>, 8 pages.
Wikipedia contributors, "Heroku." Wikipedia. The Free Encyclopedia, created on Sep. 1, 2008, [retrieved on Jun. 24, 2019], retrieved from: URL <https://en.wikipedia.org/wiki/Heroku>, 13 pages.
Wiggins, "The twelve-factor app", Jan. 30, 2011, 2 pages.
Wikipedia contributors, "Scalability." Wikipedia, The Free Encyclopedia., created on Feb. 20, 2003, [retrieved on Jun. 24, 2019], retrieved from: URL <https://en.wikipedia.org/wiki/Scalability>, 15 pages.
Wikipedia contributors, "Message-oriented middieware." Wikipedia, The Free Encyclopedia, created on Jan. 13, 2004, [retrieved on Jun. 24, 2019], retrieved from: URL <https://en.wikipedia.org/wiki/Message-oriented_middleware>, 8 pages.
Wikipedia contributors, "RabbitMQ." Wikipedia, The Free Encyclopedia, created on Mar. 11, 2010, [retrieved on Jun. 24, 2019], retrieved from: URL <https://en.wikipedia.org/wiki/RabbiIMQ.>, 4 pages.
Wikipedia contributors, "Polling (computer science)." Wikipedia, The Free Encyclopedia, created on Mar. 26, 2006, [retrieved on Jun. 24, 2019], retrieved from: URL <https://en.wikipedia.org/wiki/Polling_(computer_science), 5 pages.
Pentaho Solutions: Business Intelligence and Data Warehousing with Pentaho and MySQL, John Wiley & Sons., 2009, 652 pages.
Microsoft.com [Online], "Lift and shift SQL Server Integration Services workloads to the cloud" Sep. 22, 2018. [Retrieved on Jun. 14, 2019], retrieved from: URL <https://docs.microsoft.com/en-us/sql/integration-services/lift-shift/ssis-azure-lift-shift-ssis-packages-overview?view=sql-server-2017>, 7 pages.
Wikipedia contributors, "Chaos engineering." Wikipedia, The Free Encyclopedia, created on Nov. 10, 2014, [retrieved on Jun. 24, 2019], retrieved from: URL <https://en.wikipedia.org/wiki/Chaos_engineering>, 7 pages.
SAP.com[Online], "Block Diagrams (TAM)", SAP Power Designer Help Portal, Jun. 26, 2019, [Retrieved on Jun. 26, 2019], retrieved from: URL <https://help.sap.com/saphelp_pd1655_oom/helpdata/en/c8/18cfa96e1b1014abb5d137d4620b1e/frameset.htm>, 2 pages.
Wikipedia contributors, "Class diagram." Wikipedia, The Free Encyclopedia, created on Aug. 24, 2005, [retrieved on Jun. 26, 2019], retrieved from: URL <https://en.wikipedia.org/wiki/Class_diagram>, 10 pages.
Wikipedia contributors, "Stereotype (UML)." Wikipedia, The Free Encyclopedia, created on Mar. 6, 2005, [retrieved on Jun. 26, 2019], retrieved from: URL <https://en.wikipedia.org/wiki/Stereotype_(UML)>, 4 pages.
Wikipedia contributors, "Message queue." Wikipedia, The Free Encyclopedia, created on Jan. 13, 2004, [retrieved on Jun. 26, 2019], retrieved from: URL <https://en.wikipedia.org/wiki/Message_queue>, 10 pages.
Wikipedia contributors, "Publish—subscribe pattern." Wikipedia, The Free Encyclopedia, created on Dec. 28, 2004, [retrieved on Jun. 26, 2019], retrieved from: URL <https://en.wikipedia.org/wiki/Publish%E2%80%93subscribe_pattern>, 11 pages.
Wikipedia contributors, "Activity diagram." Wikipedia, The Free Encyclopedia, created on Nov. 29, 2005, [retrieved on Jun. 26, 2019], retrieved from: URL <https://en.wikipedia.org/wiki/Activity_diagram>, 4 pages.
Wikipedia contributors, "UML state machine." Wikipedia, The Free Encyclopedia, created on Aug. 12, 2009, [retrieved Jun. 26, 2019], retrieved from: URL <https://en.wikipedia.org/wiki/UML_state_machine>, 25 pages.
Wikipedia contributors, "Heartbeat (computing)." Wikipedia, The Free Encyclopedia, created on Mar. 17, 2013 [retrieved on Jun. 26, 2019], retrieved front: URL <https://en.wikipedia.org/wiki/Heartbeat_(computing)>, 2 pages.
Wikipedia contributors, "Sequence diagram." Wikipedia, The Free Encyclopedia, created on Apr. 28, 2005, [retrieved on Jun. 26, 2019], retrieved from: URL <https://en.wikipedia.org/wiki/Sequence_diagram>, 4 pages.

\* cited by examiner

SCALABLE DATA EXTRACTOR

BACKGROUND

Execution of software systems results in generation of volumes of data. In some software systems, data can reach multiple terabytes, and even petabytes. In some instances, data is to be transferred from a software system to another software system. For example, a so-called legacy software system (e.g., an on-premise system) may be replaced by a new software system (e.g., a cloud-computing system). Consequently, data from the legacy software system is moved to the new software system.

Transferring data from legacy software systems is challenging. One problem is reliability. For example, the legacy software system might not be designed to output the desired volume of data through the available method, which can result in errors during retrieval. One example of this is bulk extraction of data through web services (e.g., using REST protocols, OData), which can strain the legacy software system (source system) and result in numerous time-outs. Another problem is scalability. Data extraction is typically an input/output (I/O)-bound process occurring in bursts. Resource utilizations are high whenever there is a data extraction process occurring. However, the load drops to almost no load in the absence of such process occurring. Consequently, computing resources for data extraction need to be scaled up and down dynamically.

Further, in data transfer scenarios, once a consuming system triggers a data request, the source system should dutifully respond with all of the data that was requested. However, in cloud computing systems, that is often not the case. For example, the source system and the consumer system could be located in different data centers in different infrastructure as a service (IaaS) providers. As another example, one or both of the source system and the consuming system may be located in a region having reduced bandwidth or intermittent availability of communications. As still another example, outages, partial outages (reduced service level), or even planned downtimes can occur at either end of the communications channel. Consequently, a request for data transfer can return a partial result or yield an error—recoverable or un-recoverable.

SUMMARY

Implementations of the present disclosure are directed to a data extraction system that extracts data from a source system in a scalable and fault-tolerant manner. More particularly, implementations of the present disclosure are directed to a data extraction system that retrieves data from the source system on a per page basis (i.e., at the page level), such that only a query of a respective page is re-executed, if a failure in extracting data from the source system occurs.

In some implementations, actions include determining, by an extraction worker of a data extraction system, a number of pages based on data that is to be extracted from the source system, for each page, by a respective extraction worker: querying the source system, and storing a query result in a respective page file within a staging data file system of the data extraction system, for each extraction worker that queries the source system, verifying a status of the extraction worker after expiration of a predetermined delay time based on a timestamp of the page that the extraction worker is handling, and determining that a page status for each page is completed, and in response, posting an extraction completed message to inform the consuming system that the data has been extracted from the source system. Other implementations of this aspect include corresponding systems, apparatus, and computer programs, configured to perform the actions of the methods, encoded on computer storage devices.

These and other implementations can each optionally include one or more of the following features: for each page, querying the source system is executed in response to posting of an extract page message for each page within the data extraction system; actions further include determining that a query failed, and determining that a retry count does not exceed a retry count threshold, and in response, again querying the source system using the query; actions further include determining that a query succeeded, and in response, setting a page status of a page associated with the query to completed, the delay time is set in response to a tally extraction worker request; the timestamp is updates in response to a query page status request; and in response to the query page status request, an extraction worker determines that a page identified in the query page request is being handled by the extraction worker and updates the timestamp in response.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
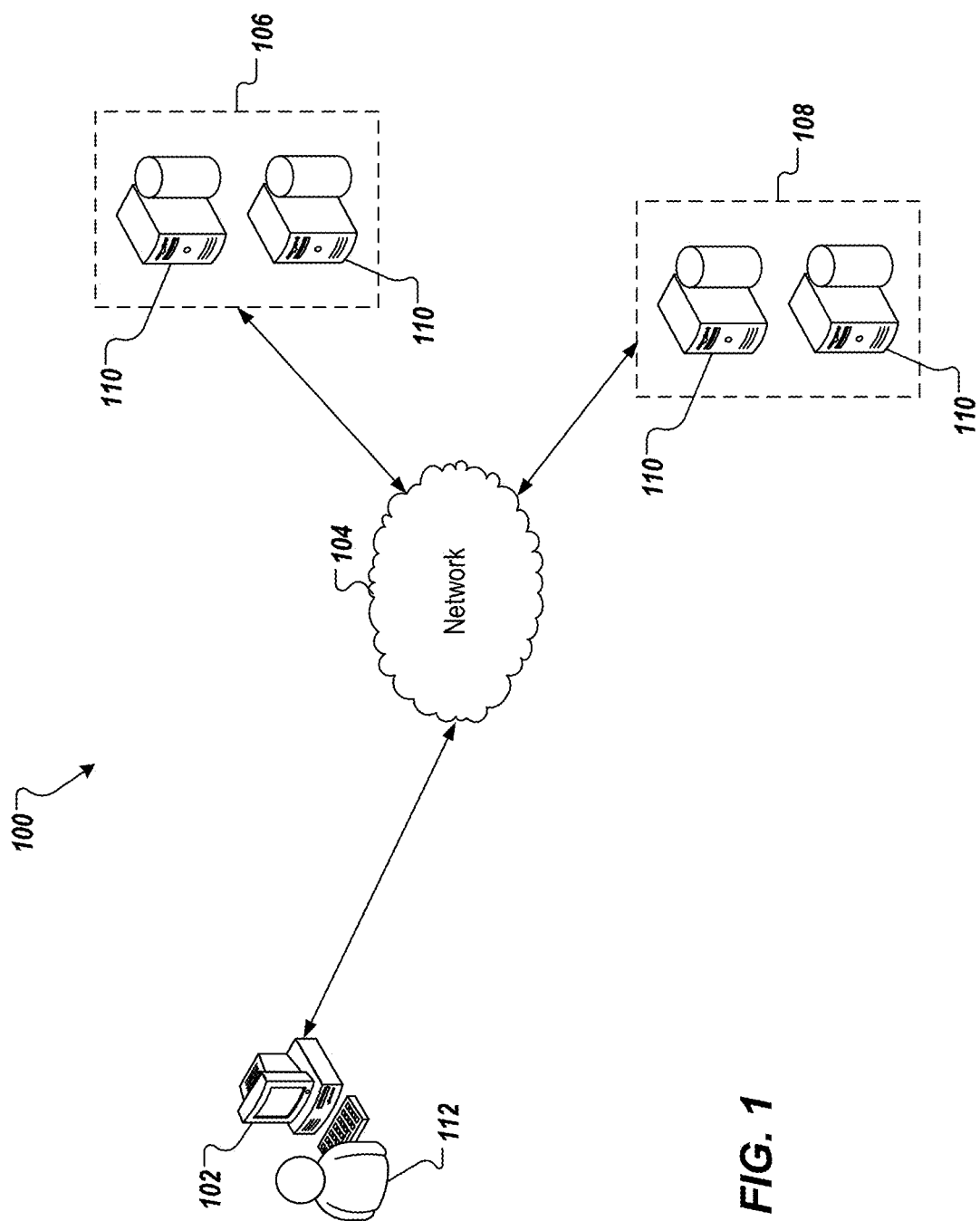
FIG. 1 depicts an example architecture that can be used to execute implementations of the present disclosure.

Implementations of the present disclosure are directed to a data extraction system that extracts data from a source system in a scalable and fault-tolerant manner. More particularly, implementations of the present disclosure are directed to a data extraction system that retrieves data from the source system on a per page basis (i.e., at the page level), such that only a query of a respective page is re-executed, if a failure in extracting data from the source system occurs. Implementations can include actions of determining, by an extraction worker of a data extraction system, a number of pages based on data that is to be extracted from the source system, for each page, by a respective extraction worker: querying the source system, and storing a query result in a respective page file within a staging data file system of the data extraction system, for each extraction worker that queries the source system, verifying a status of the extraction worker after expiration of a predetermined delay time based on a timestamp of the page that the extraction worker is handling, and determining that a page status for each page is completed, and in response, posting an extraction completed message to inform the consuming system that the data has been extracted from the source system.

To provide further context for implementations of the present disclosure, and as introduced above, execution of software systems results in generation of volumes of data. In some software systems, data can reach multiple terabytes, and even petabytes. In some instances, data is to be transferred from a software system to another software system. For example, a so-called legacy software system (e.g., an on-premise system) may be replaced by a new software system (e.g., a cloud-computing system). Consequently, data from the legacy software system (also referred to as source system) is moved to the new software system (also referred to as consuming system).

Transferring data from legacy software systems is challenging. One problem is reliability. For example, the legacy software system might not be designed to output the desired volume of data through the available method, which can result in errors during retrieval. One example of this is bulk extraction of data through web services (e.g., using REST protocols, OData), which can strain the legacy software system (source system) and result in numerous time-outs. Another problem is scalability. Data extraction is typically an input/output (I/O)-bound process occurring in bursts. Resource utilizations are high whenever there is a data extraction process occurring. However, the load drops to almost no load in the absence of such process occurring. Consequently, computing resources for data extraction need to be scaled up and down dynamically.

Further, in data transfer scenarios, once a consuming system triggers a data request, the source system should dutifully respond with all of the data that was requested. However, in cloud computing systems, that is often not the case. For example, the source system and the consumer system could be located in different data centers in different infrastructure as a service (IaaS) providers. As another example, one or both of the source system and the consuming system may be located in a region having reduced bandwidth or intermittent availability of communications. As still another example, outages, partial outages (reduced service level), or even planned downtimes can occur at either end of the communications channel. Consequently, a request for data transfer can return a partial result or yield an error—recoverable or un-recoverable.

In cloud computing, platform as a service (PaaS) strategies are becoming increasingly popular. These strategies typically involve running applications in a highly constrained environment—having a relatively small amount of memory, disk, and CPU cycles available. In turn, scaling is done by replicating instances of these applications to be run in different containers as required. Some PaaS strategies go further and require applications to be stateless—not keeping data about its users or its processing information in memory for longer than a few seconds, again to facilitate scalability.

Extract, transform, and load (ETL) software is typically employed to facilitate the transfer of data from a source system to a target system. However, many readily-available ETL software (both commercial, free, or open-source) are not designed to be run inside a PaaS. Instead, the runtime environment requirements for these systems often resemble that of a database: large memory quota, significant local disk space for persistence, and a large amount of CPU cycles available. In contrast, a typical PaaS offering assigns a relatively small amount of memory for an application instance (e.g., approximately 4 GB) and a transient local file system that is reset when the corresponding application is restarted. All of these restrictions align with the horizontal scaling strategy of PaaS.

In view of the above context, implementations of the present disclosure are directed to a cloud-native data extraction system that is executable in a PaaS landscape (e.g., Heroku, Cloud Foundry). The data extraction system of the present disclosure functions to extract data from a web service (e.g., REST, OData, network API) into a staging area for further processing in transform and load phases of ETL. The data extraction system of the present disclosure can be implemented as a standalone application, a software library, or can form the base of a full-fledged ETL software.

In some implementations, the data extraction system is provided as a twelve factor (12-factor) application. In general, 12-factor applications are developed under the so-called 12-factor application methodology, which can be described as a methodology for building SaaS applications. The 12-factor application methodology encapsulates best practices that are designed to enable applications to be built with portability and resilience when deployed to the web. Further detail on 12-factor applications is provided at https://12factor.net/.

In some implementations, the data extraction system executes multiple workflows for transferring data from a source system to a consuming system. One workflow includes querying the source system in a fault-tolerant manner, including splitting the query into smaller result-sets and performing retries, if a smaller result-set fails. Another workflow includes persisting the query result into a staging area for further transformation and/or loading into the consuming systems. The data extraction system also provisions for horizontal scalability, including coordination between multiple small independent instances of the application. In some implementations, the data extraction system subdivides the data records to be extracted into a series of pages, each subset having a fixed number of records. The data extraction system uses these pages as the basic unit of resiliency. If a failure in extracting data from the source system occurs, only the query of the respective page is re-executed.

In some implementations, the data extraction system externalizes state information into a set of control files as well as a set of messages managed by a message-oriented middleware (e.g., RabbitMQ). Externalizing the state information enables the data extraction system to be deployed as a 12-factor application, which mandates applications to be stateless. Using a filesystem for control data alleviates the need for locking, which contributes to scalability and throughput. Furthermore, using messaging for coordination eliminates the need for polling, thereby conserving computational resources.

FIG. 1 depicts an example architecture 100 in accordance with implementations of the present disclosure. In the depicted example, the example architecture 100 includes a client device 102, a network 104, and server systems 106, 108. Each server system 106, 108 includes one or more server devices and databases 110 (e.g., processors, memory). In the depicted example, a user 112 interacts with the client device 102.

In some examples, the client device 102 can communicate with the server systems 106, 108 over the network 104. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 104 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 106, 108 each includes at least one server and at least one data store. In the example of FIG. 1, the server systems 106, 108 are intended to represent various forms of servers including, but not limited to a web server, an application server, a proxy server, a network server, and/or a server pool. In general, server systems accept requests for application services and provides such services to any number of client devices (e.g., the client device 102 over the network 104).

In accordance with implementations of the present disclosure, and as noted above, the server system 106 can host a source system and the server system can host a consuming system. The data extraction system of the present disclosure facilitates transfer of data from the source system to the consuming system. In some examples, the user 112 interacts with the data extraction system through the client device 102 to initiate and manage data transfer as described in further detail herein.

Figure 2:
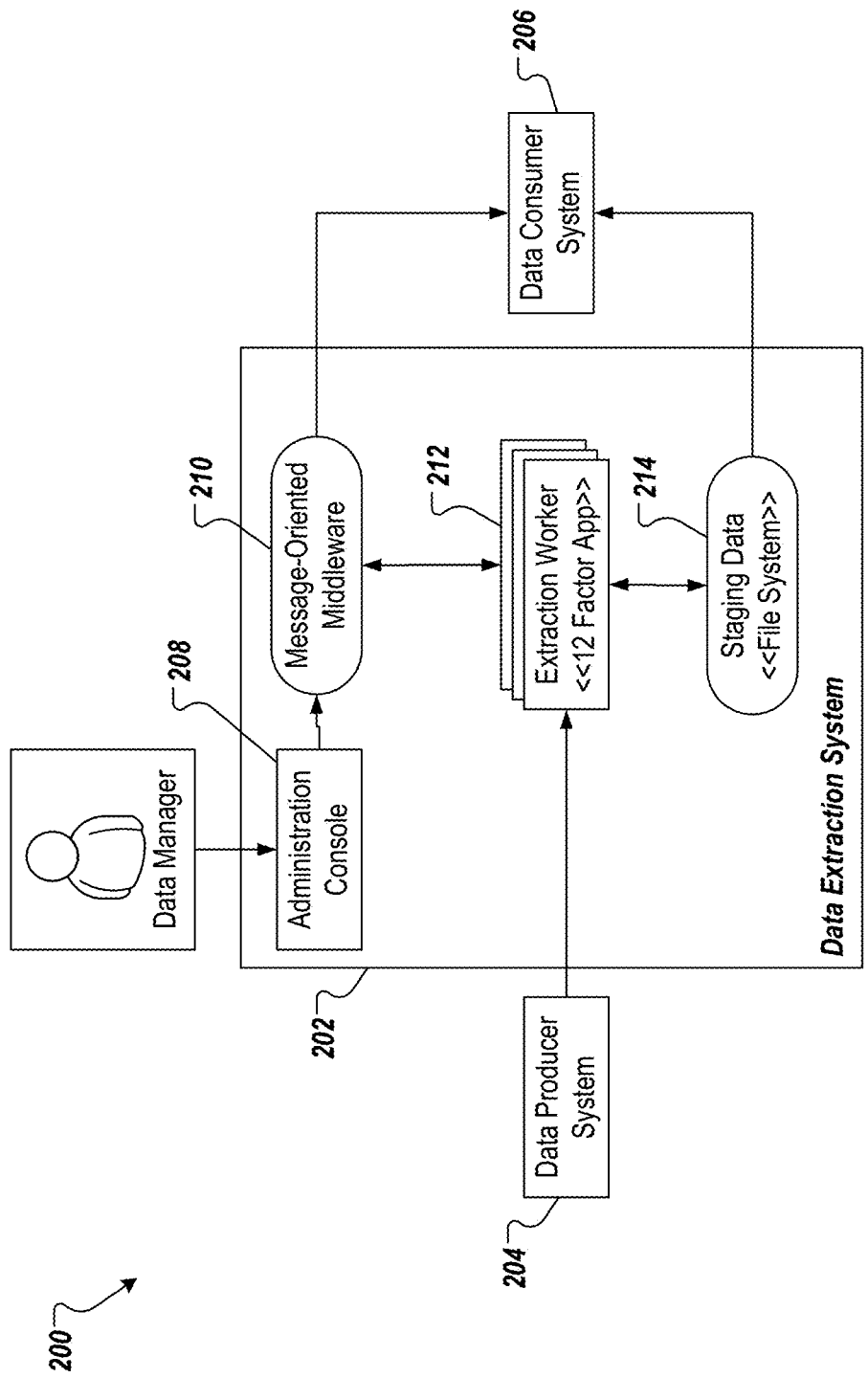
FIG. 2 depicts an example conceptual architecture in accordance with implementations of the present disclosure.

FIG. 2 depicts an example conceptual architecture 200 in accordance with implementations of the present disclosure. In the depicted example, conceptual architecture 200 includes a data extraction system 202, a source system 204, and a consuming system 206. As described herein, the data extraction system 202 facilitates transfer of data from the source system 204 to the consuming system 206. In the depicted example, the data extraction system 202 includes an administration console 208, message-oriented middleware 210, one or more extraction workers 212 (e.g., each provided as an application instance), and a staging data file system 214.

In some implementations, a user (e.g., an administrator) interacts with the administration console 208. In some examples, the administration console is provided as a web-based application or other user-interface technologies. The user initiates data extraction using the administration console 208, which sends a message through the message-oriented middleware 210 (e.g., RabbitMQ) for processing by an extraction worker 212. In some examples, the extraction worker 212 is provided as a cloud-hosted 12-factor application. In some examples, the extraction worker 212 is provided as a collection of processes that run independently and coordinate among themselves using the message-oriented middleware 210 and the staging data file system 214.

In some implementations, the data extraction system 202 connects to the source system 204 to query various portions of a data-set that is to be extracted from the source system 204. Upon completion of extraction of the data-set, an extraction worker 212 sends a message to the consuming system 206 (e.g., a message brokered by the message-oriented middleware 210) notifying that the extraction process had completed and that the extracted data is in the staging data file system 214 and is ready for further processing.

In some implementations, the extraction worker 212 uses control data. In some examples, multiple types of control data are used by the extraction worker 212 during processing. Example types include message, topic, and control file. In some examples, message include queue messaging items, where, for every instance of the message, there is exactly one producer and one consumer. The message-oriented middleware 210 manages this data and ensures delivery of each instance. In some examples, a topic is a publish/subscribe item that are distributed to all participants that are subscribed to the topic. This is a one-to-many broadcast that is brokered by the message-oriented middleware 210. In some examples, a control file is provided as a plain data file stored in the staging data file system 214 that are used to keep track of status of the job and various sub-jobs.

In some implementations, messages include a start extraction message, an extract page message, a tally extraction message, a verify worker status message, and an extraction completed message. In some examples, the start extraction message is sent to initiate the data extraction process. The start extraction message contains a unique job identifier (Job ID) that identifies the job and a query specification that describes how to connect to the source system 204. For example, the query specification includes a location of the source system 204 (e.g., IP address), authentication credentials, ordering conditions, and filter conditions. In some examples, the extract page message is sent by an instance of the extraction worker 212 to another instance of the extraction worker 212 to perform data extraction of a subset of the data and includes the Job ID and a page number. The subset of data is referred to as a page associated with the page number. In some examples, the tally extraction message an instance of the extraction worker 212 to another instance of the extraction worker 212 to check the overall status of the job and includes the Job ID. In some examples, the verify worker status message is sent by an instance of the extraction worker 212 to another instance of the extraction worker 212 to verify whether an extract page process is still running as expected and includes the Job ID and a page number. In some examples, the extraction completed message is produced by the data extraction system 202 to notify completion (success or failure) of the data extraction process and includes the Job ID.

In some implementations, a topic includes a query page status topic that is broadcast by an instance of the extraction worker 212 to all other instances of the extraction worker 212 to determine whether an extract page process is still running as expected. The query page status topic includes the Job ID and page number. In some implementations, control files include a job information file and a page information file. In some examples, the job information file contains the current status of a data extraction job as well as persisting the query specification of the job. The job information file includes the Job ID, a job status, and the query specification. In some examples, the job status includes one of pending, in-progress, failed, if one or more page extractions fail, or succeeded, if all page extractions have completed. In some examples, the page information file contains the current status of a data extraction page (subset of the job), the sub-query specification of the page, and other control data required for retry operations. The page information file includes the Job ID, a page ID, a page status, a sub-query specification, and a retry count. In some examples, page status includes one of pending, in-progress, failed, if a non-recoverable failure occurs, and completed, if successfully extracted.

Figure 3:
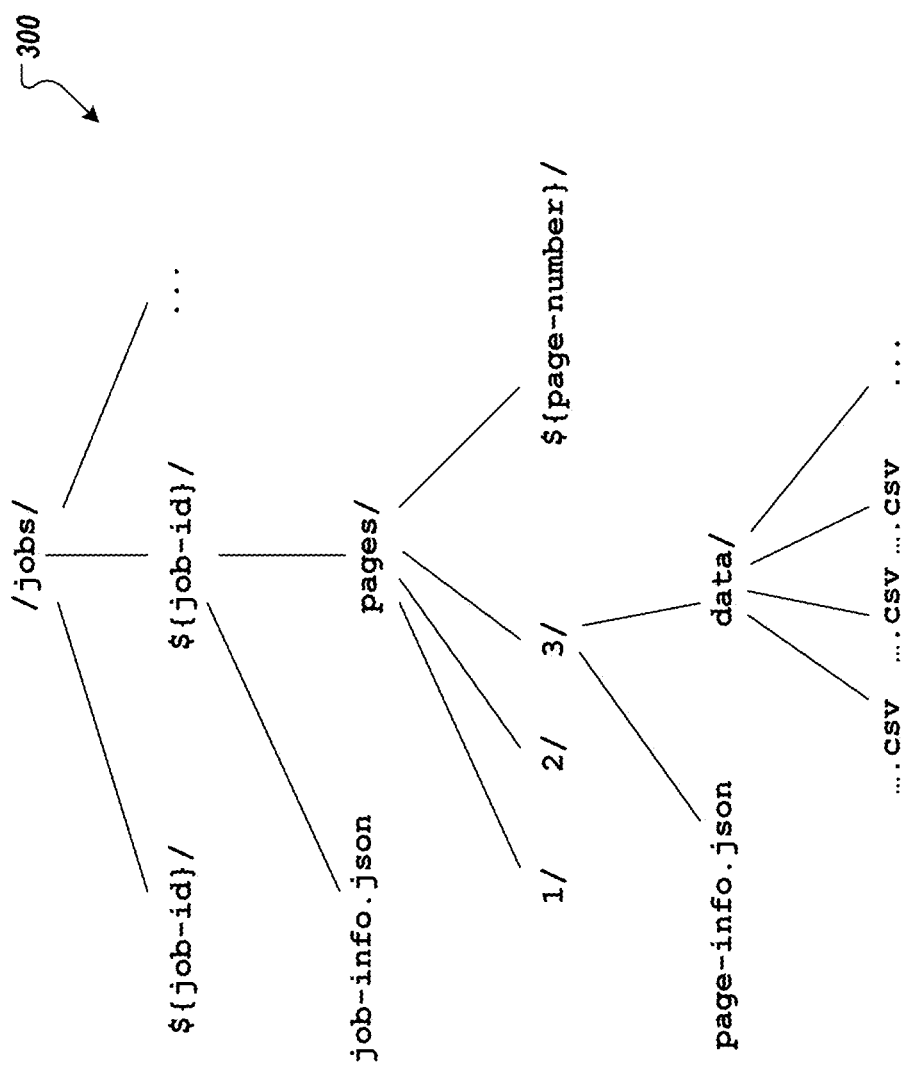
FIG. 3 depicts an example structure for storage of staging data in accordance with implementations of the present disclosure.

FIG. 3 depicts an example structure 300 for storage of staging data in accordance with implementations of the present disclosure. In some implementations, the staging data storage is a standard hierarchical file-and-folder structure that is organized in a pre-defined way. The staging data storage is deployed as a standard on-disk file system or using distributed object store technologies for improved scalability. The example structure 300 depicts how the files and folders are inter-related.

In some examples, /jobs/ is the root of the staging data storage and contains folders that are managed by the data extraction system. In some examples, ${job-id}/ is a first-level folder that is named after the unique identifier of the job (i.e., Job ID) and each contains data and control files of the corresponding data extraction job. In some examples, the job-info.json file is the job information control file containing metadata on the entire job extraction process. In some examples, within the pages/ folder are sub-folders ${page-number}/ named after the corresponding page number. In some examples, the page-info.json file is the page information control file for monitoring the progress of the page. In some examples, the data/folder contains files of the extracted data for the given page.

Figure 4:
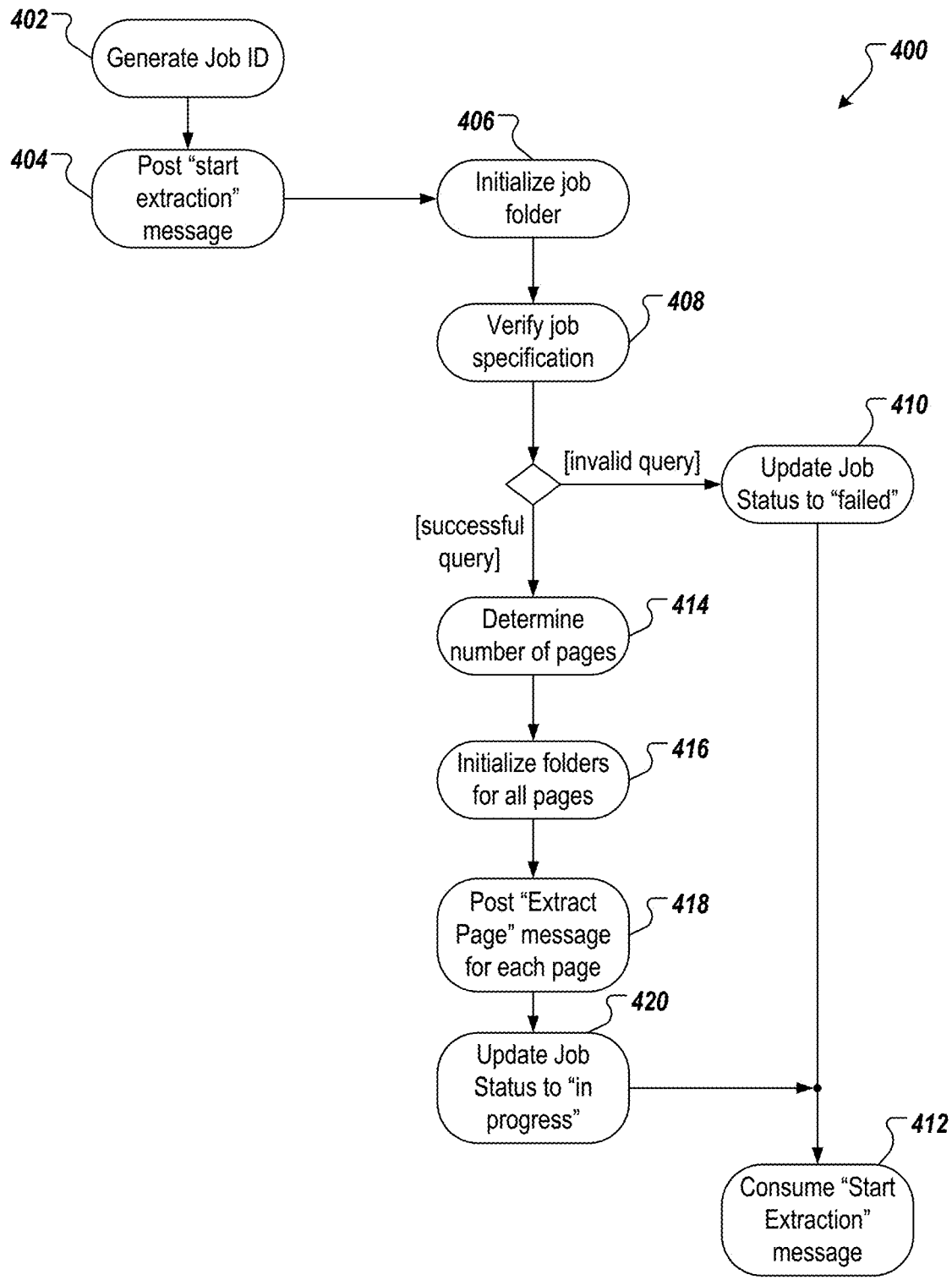
FIGS. 4-6, 8 and 9 depict example processes that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 is executed to start the data extraction from a source system.

A Job ID is generated (402) and a start extraction message is submitted (404). For example, the administration console 208 of FIG. 2 submits a start extraction message including the Job ID and query specification through the message-oriented middleware 210, which provides the start extraction message to an instance of an extraction worker 212 for handling. This activity marks the start of a data extraction job.

A job folder is initialized (406). For example, the extraction worker 212 creates a job folder inside the staging data file system 214, creates the job information control file and sets the job status to pending. A job specification is verified (408). For example, the extraction worker 212 contacts the source system to verify the data query specification. In some examples, the source system also indicates the number of data records that are to be extracted.

In some examples, the job specification is provided as a statement (e.g., a SQL statement), a request through a web API, or a web query protocol (e.g., OData). Using a SQL statement as a non-limiting example, the SQL statement can be issued (e.g., by the extraction worker) to query certain records of table in the source system. An example SQL statement can include:
SELECT id, name FROM employee WHERE join_date >='2019-01-01' ORDER BY id;
The example SQL statement requests the employee ID and name of those employees, who joined from year 2019 onwards. In this example, an example validation query (used to verify the data query specification) can be provided as:
SELECT id, name FROM employee@remote_database WHERE join_date >='2019-01-01' LIMIT 1;
In the above example validation query, the bold text indicates difference from the example job specification SQL statement. The validation query can be described as a test query that returns only the first record matching the defined criteria. Sending this to the source system (denoted by remote_database) would also validate whether there is a table called employee and the table has columns named id, name, and join date. If this query is successful, then the original job specification is valid. If the query is not valid, then source system returns an error.

It is determined whether the query is valid or invalid based on the verification. If the query is invalid (or the source system cannot be contacted), the job status is updated to failed (410) and the start extraction message is consumed (412). In some examples, the start extraction message is consumed by removing the start extraction message from a message queue, such that the message-oriented middleware 210 does not resend the message. If the query is valid, a number of pages is determined (414). For example, the extraction worker 212 subdivides the number of records indicated by the source system into fixed-sized chunks, each chunk being a page.

As another non-limiting example, the following example SQL statement derived from the job specification would count the total number of records that would be returned in case the query is fully executed:
SELECT count(*) AS total_records FROM employee@remote_database WHERE join_date >='2019-01-01';
Again, in the above example, the bold text indicates difference from the example job specification SQL statement.

The above example query yields a single integer value called total_records, which can be used to subdivide the query into pages. For example:
SELECT id, name FROM employee@remote_database WHERE join_date >='2019-01-01' ORDER BY id OFFSET x LIMIT y;
Accordingly, the extraction workers would have differing value of the offset x. In this manner, each extraction worker receives a different page of the query for processing, as described herein. For example, if there are 1000 total records and the pre-set page size is 100, then the value of LIMIT y would always be LIMIT 100. However, each extraction worker that processes a page would have different offset values, each for their respective page. For example:
OFFSET 0—for the first page
OFFSET 100—for the second page
OFFSET 200—for the third page
In some implementations, the number of pages is the total number of records divided by the page size and is rounded upward. For example:

number_of_pages=ceiling(record_count/page_size)

In some examples, the page size is an optimization parameter that is dependent on the capabilities of the source system as well as the nature of the data. For example, the page size can be provided as an integer that is large enough, but not too large. In this manner, each page is sized to account for as large of a volume of data without causing request timeouts, out-of-memory issues, or the like. By way of non-limiting example, for a 1050-record data set and 100-record page size, the number of pages would be:

$$\text{number\_of\_pages} = \text{ceiling}(1050/100) = \text{ceiling}(10.5) = 11$$

Folders are initialized for the pages (416). For example, the extraction worker 212 creates the numbered page folders inside the pages subfolder, creates the page information control file for each page folder, and sets the page status to pending. An extract page message is posted for each page (418) and the job status is updated to in-progress (420).

Figure 5:
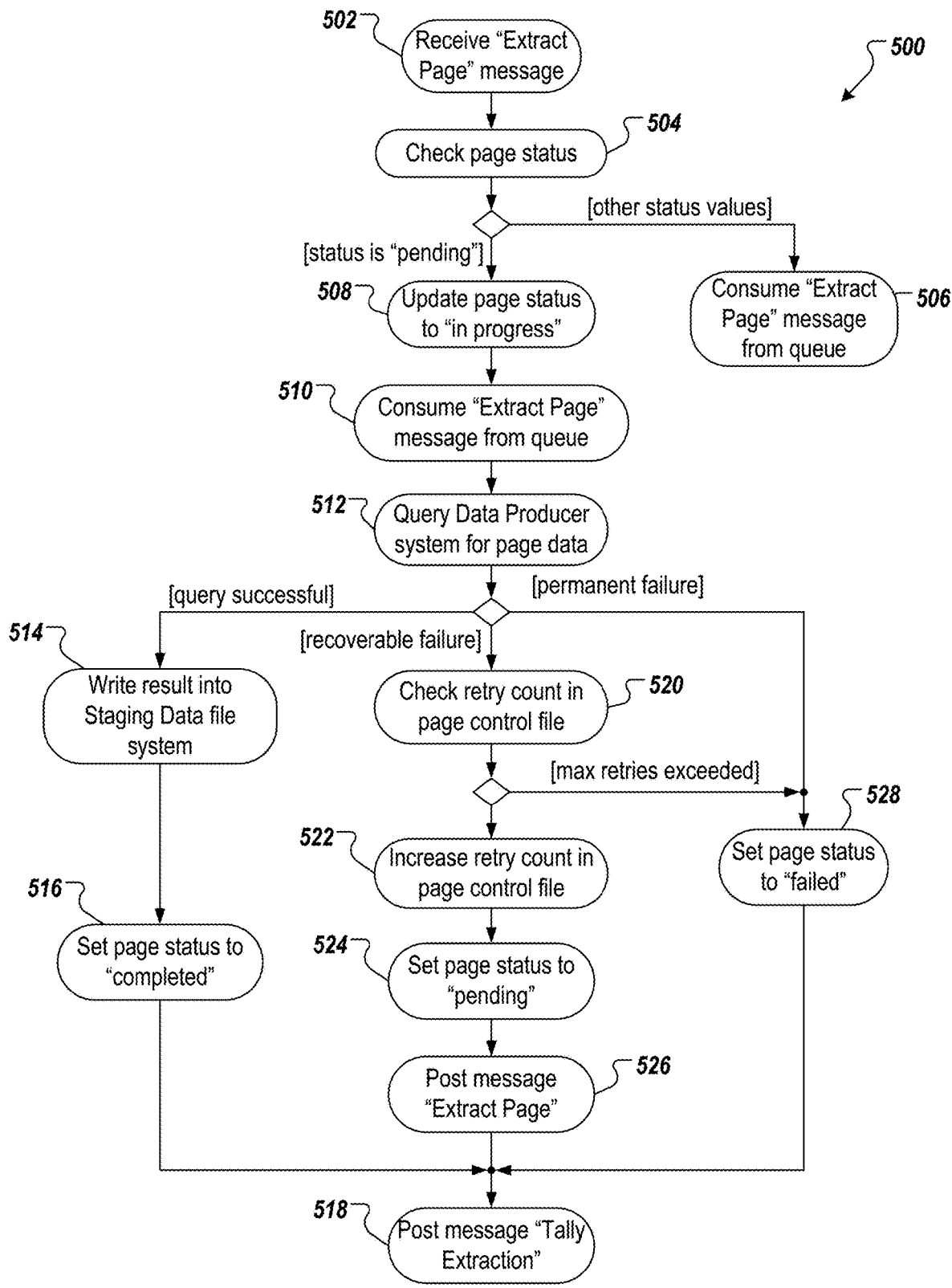

FIG. 5 depicts an example process 500 that can be executed in accordance with implementations of the present disclosure. In some examples, the example process 500 is provided using one or more computer-executable programs executed by one or more computing devices. The example process 500 depicts handling of each extract page message by a respective instance of the extraction worker 212 of FIG. 2. If needed, any data transformations done for individual records (i.e. those transformations that do not include tallying multiple records together) can also be done as part of handling of the respective extract page message. However inter-record transformations cannot be done since the data retrieval process is not yet complete at this point.

An extract page message is received (502). For example, an instance of an extraction worker 212 receives the extract page message. A page status is checked (504). For example, the extraction worker 212 checks the page status as recorded within the respective page information control file. It is determined whether the page status is pending. If the page status is not pending, the extract page message is consumed from the message queue (506) and the example process 500 ends.

If the page status is pending, the page status is updated to in-progress (508) and the extract page message is consumed from the message queue (510). For example, the extraction worker 212 that received the extract page message handles the page extraction and updates the page status to in-progress and removes the extract page message from the message queue. The source system is queried for the page data (512). For example, the extraction worker 212 queries the source system. It is determined whether the query is successful, a recoverable failure occurred, or a permanent failure occurred.

If the query is successful, the query result that is received is written to the staging data file system (514), the page status is set to completed (516), and a tally extraction message is posted (518). For example, the extraction worker 212 writes the page data (provided in the query result) to the job file in the staging data file system 214, updates the page status to completed, and posts the tally extraction message. In some examples, writing the query result can include intra-record data transformation.

In some examples, data transformation accounts for differences in table structure between the source system and the consuming system. By way of non-limiting example, the source system can provide employee data as a table with the following example columns:
  Employee ID
  Employee Name
  Join Date
  End Date However, in this example, the consuming system stores the data as a table with the following example columns:
  Employee ID
  Is Active In this example, an intra-record transformation would look for the End Date of an employee record as input and set the Is Active output column to False, if the End Date is filled (not empty/NULL) and is in the past. Otherwise, the Is Active column will be True. This is an intra-record transformation, because processing does not cross record boundaries. All data needed to produce a record on the output side is available in the input side of the corresponding record. In contrast, an example of an inter-record transformation would be getting the total number of active employees by join month. This would need to aggregate the more than one employee record in the input side to provide an output record.

If it is determined that a recoverable failure has occurred, a retry count recorded in the page control file is checked (520). If the retry count does not exceed a threshold retry count (e.g., maximum number of retries), the retry count is incremented (522), the page status is set to pending (524), and an extract page message is posted (526). In this manner, extraction of the respective page is again attempted. If it is determined that a permanent failure had occurred, or the retry count exceeds the threshold retry count, the page status is set to failed (528).

Figure 6:
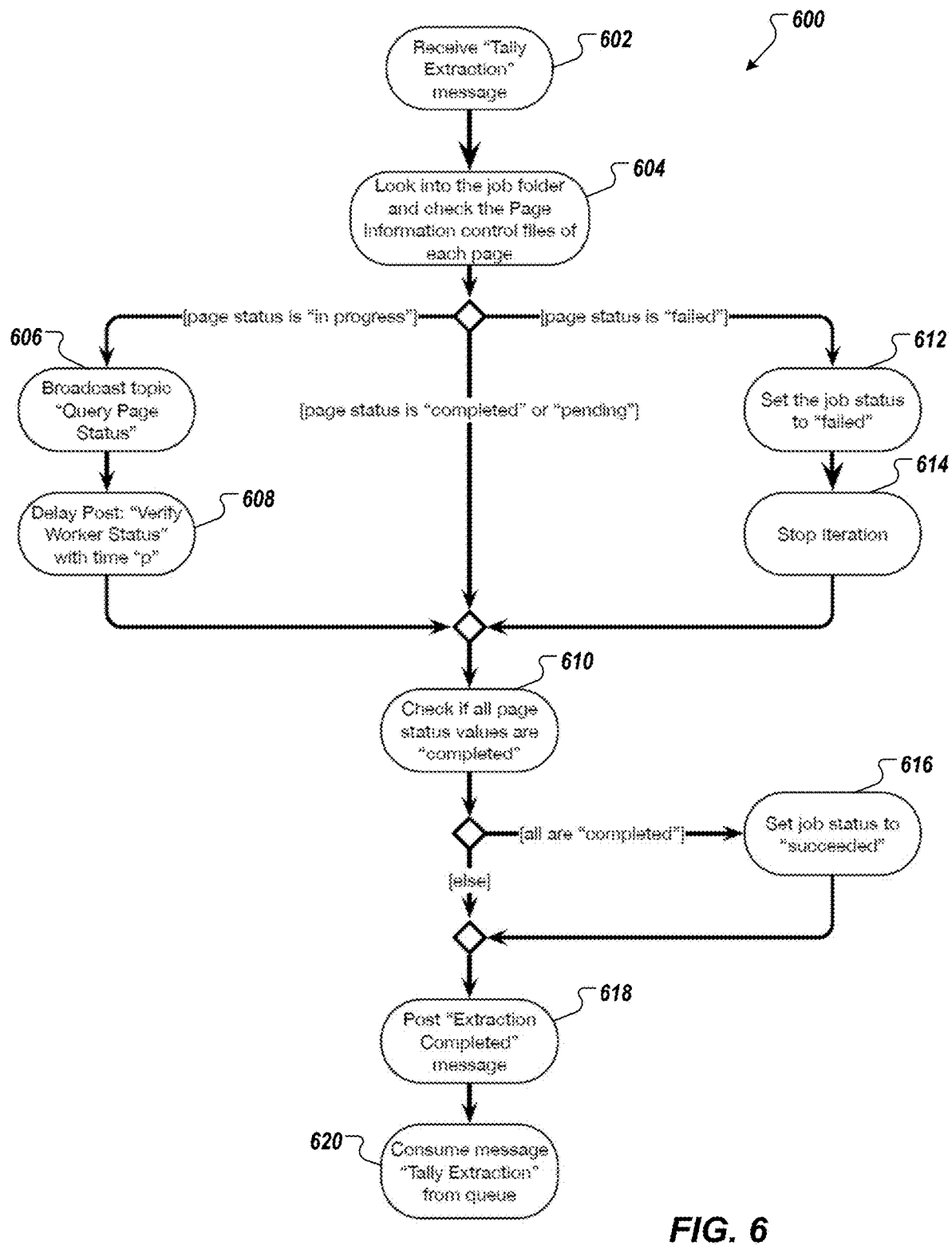

FIG. 6 depicts an example process 600 that can be executed in accordance with implementations of the present disclosure. In some examples, the example process 600 is provided using one or more computer-executable programs executed by one or more computing devices. The example process 600 depicts handling of a tally extraction message by a respective instance of the extraction worker 212 of FIG. 2. In some examples, each tally extraction message can be described as a heart-beat that checks whether the job is completed or whether an instance of the extraction worker 212 stopped executing.

A tally extraction message is received (602). For example, an instance of the extraction worker 212 receives the tally extraction message. The page information control files for each page of the job are accessed. For each page, it is determined whether the page status is pending, in-progress, failed, or completed. If the page status is in-progress, the query page status topic is broadcast (606) and posting of a verify extraction worker status message is delayed by a time p (608), and it is determined whether all page status values are set to completed (610). If the page status is failed, the job status is set to failed (612), the iteration is stopped (614), and it is determined whether all page status values are set to completed (610). If the page status is completed or pending, it is determined whether all page status values are set to completed (610). If all page status values are set to completed, the job status is set to succeeded (616). An extraction completed message is posted (618), and the tally extraction message is consumed from the message queue (620).

Figure 7:
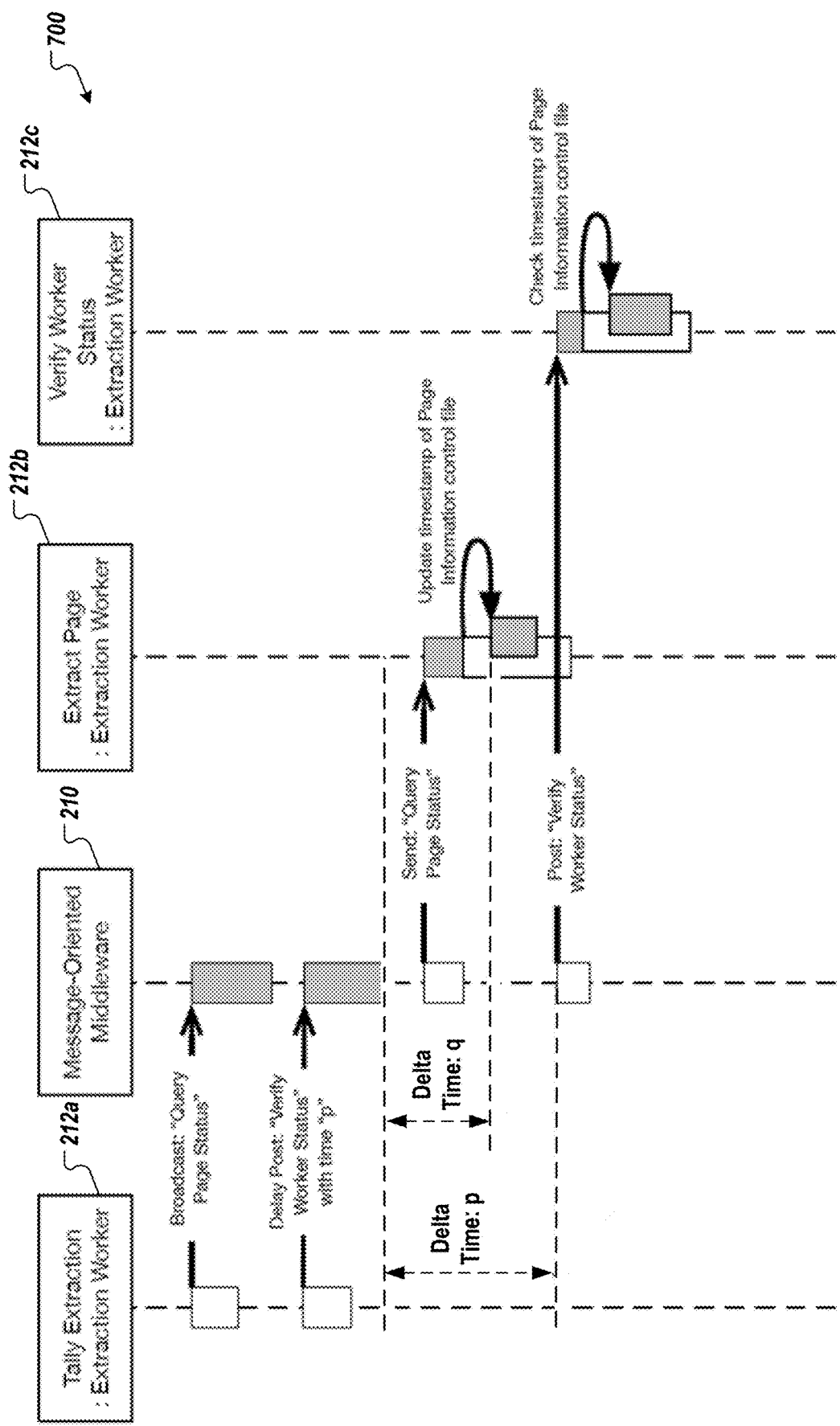
FIG. 7 depicts an example sequence diagram representing messaging in accordance with implementations of the present disclosure.

FIG. 7 depicts an example sequence diagram 700 representing messaging in accordance with implementations of the present disclosure. More particularly, the example sequence diagram 700 depicts processing of a query page status topic broadcast during processing of the tally extraction message. This is performed while the page status of the respective page is in-progress to determine whether the instance of the extraction worker is still running. The example sequence diagram 700 depicts an example sequence between an extraction worker 212a handling a tally extraction message, the message-oriented middleware 210, an extraction worker 212b handling an extract page message, and an extraction worker 212c handling a verify worker status message.

The extraction worker 212a triggers broadcast of the query page status topic by the message-oriented middleware 210 and indicating a delay of time p for broadcasting of a verify worker status message. The message-oriented middleware 210 broadcasts the query page status topic, which is received by the extraction worker 212b (e.g., the extraction worker 212b subscribes to the topic). The extraction worker 212b handles querying of the page status, as described below with reference to FIG. 8, and updates a timestamp of the respective page information control file during a time q. In some examples, the time p is selected, such that it is always greater than the time q processing, but not too large such that it unnecessarily delays the entire job. At expiration of the time p, the message-oriented middleware 210 broadcasts the verify worker status message, which is processed by the extraction worker 212c, as described below with reference to FIG. 9.

Figure 8:
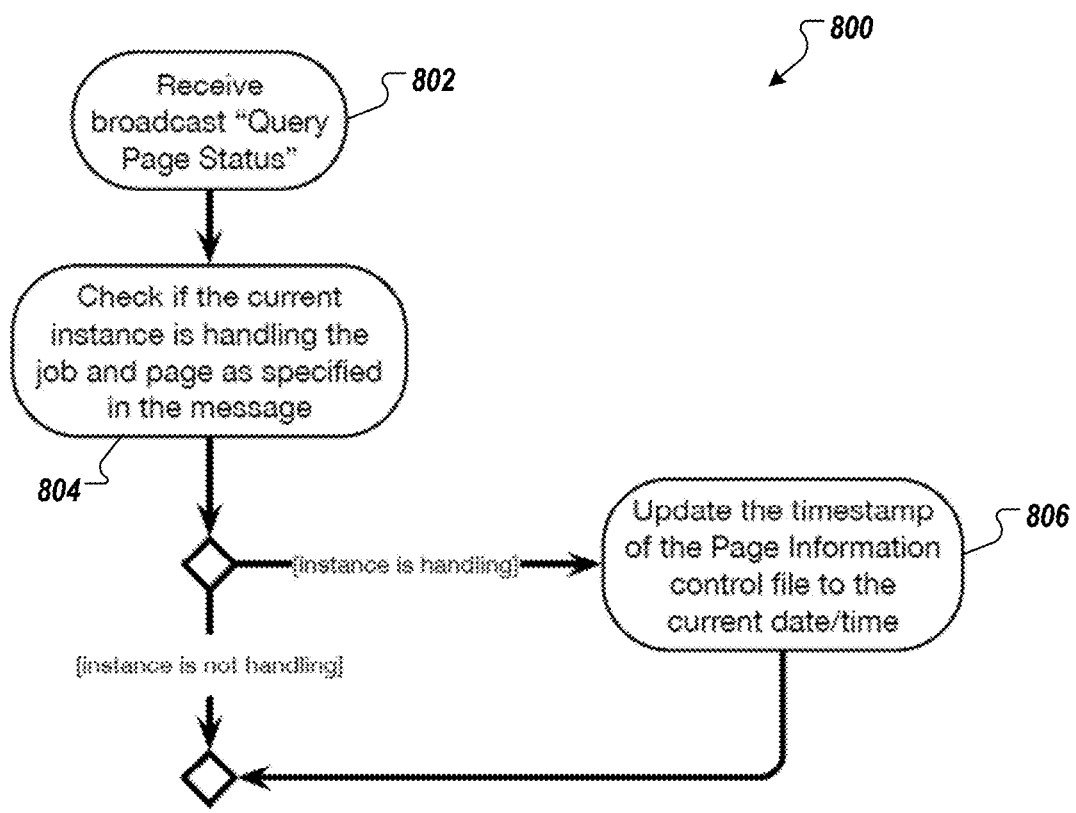

FIG. 8 depicts an example process 800 that can be executed in accordance with implementations of the present disclosure. In some examples, the example process 800 is provided using one or more computer-executable programs executed by one or more computing devices. As described herein, the query page status topic is broadcast to discover whether a page is still being actively processed an instance of the extraction worker. In turn, the extraction worker receiving this message responds by updating its page's control file timestamp to indicate activity, if the worker is handling the page being queried. Consequently, all other extraction workers would ignore the message since the page that they are respectively handling is not the page being queried.

The query page status broadcast is received (802). For example, each extraction worker 212 receives the query page status broadcast. It is determined whether the receiving instance of the execution workflow is handling the job and page as specified in the broadcast (e.g., the broadcast includes the Job ID and page number) (804). If the extraction worker 212 is handling the identified page, the extraction worker updates the timestamp of the page information control file of the identified page to the current date/time, and the example process 800 ends. If the extraction worker 212 is not handling the identified page, the example process 800 ends.

Figure 9:
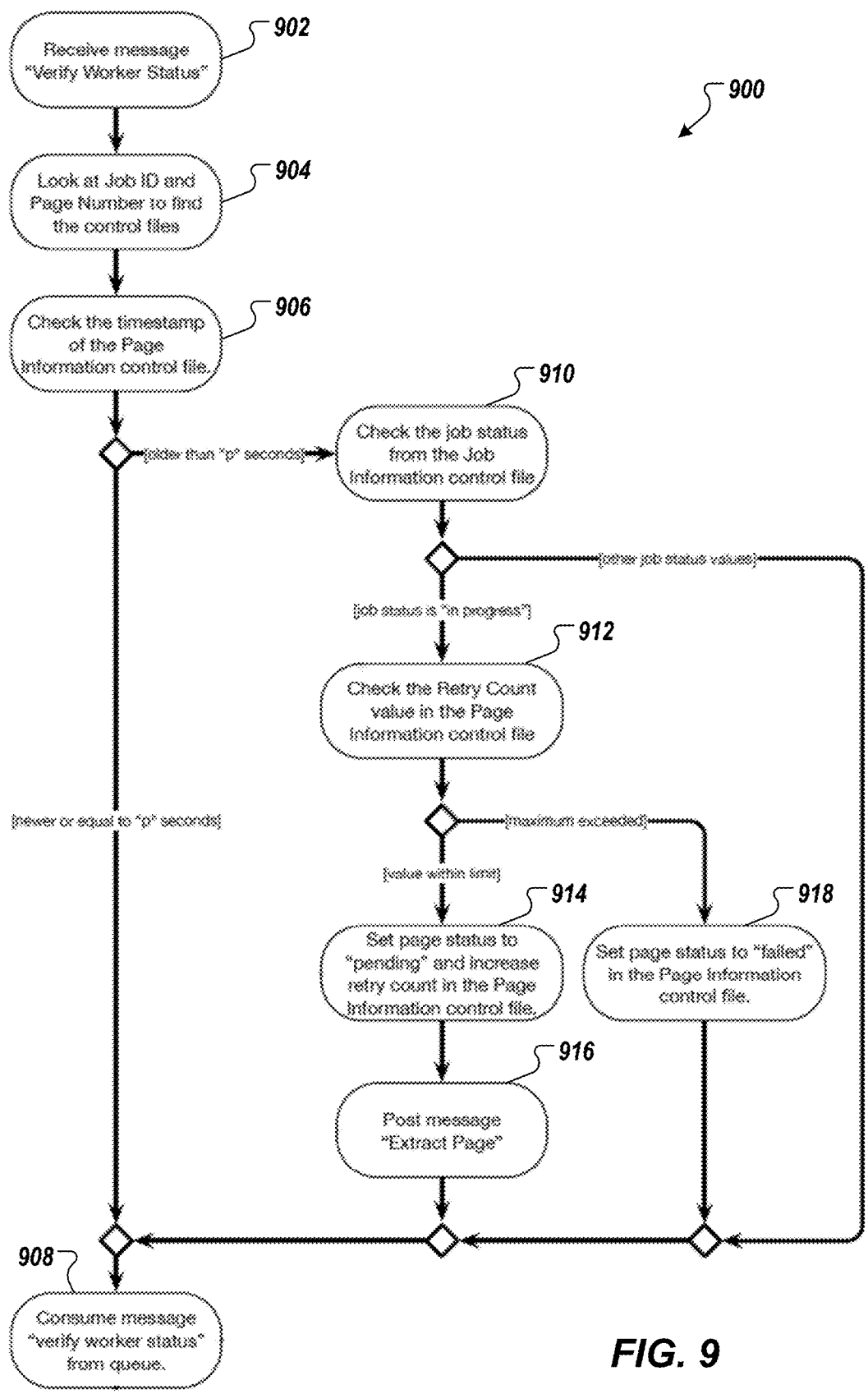

FIG. 9 depicts an example process 900 that can be executed in accordance with implementations of the present disclosure. In some examples, the example process 900 is provided using one or more computer-executable programs executed by one or more computing devices. The example process 900 is executed by an extraction worker 212 to process the verify worker status message initiated by the query page status topic. Here, the timestamp of the page information control file is inspected to ensure that it was updated in-time, which implies that there is an instance of an extraction worker that is actively processing the page. If this is not the case, the extraction worker processing the verify worker status message assumes that the extraction worker for the page had an unforeseen issue (i.e. terminated unexpectedly) and initiates a re-try of processing of the page.

A verify worker status message is received (902). A control file is identified based on the Job ID and page numbers provided in the verify worker status message (904). The timestamp of the page information control file is determined (906). It is determined whether the timestamp is older than the time p. If the timestamp is not older than the time p, the verify worker status message is consumed from the message queue (908).

If the timestamp is not older than the time p, the job status is determined from the job information control file (910). It is determined whether the job status is in-progress. If the job status is not in-progress, it is determined that the verify worker status message is duplicated and is ignored. If the job status is in-progress, the retry count is determined from the page information control file (912). It is determined whether the retry count exceeds a threshold retry count (e.g., maximum number of retries). If the retry count does not exceed the threshold retry count, the page status is set to pending and the retry count is incremented (914) and an extract page message is posted (916). If the retry count does exceed the threshold retry count, the page status is set to failed in the page information control file (918).

In accordance with implementations of the present disclosure, after all pages are successfully processed, the data that is to be transferred from the source system 204 to the consuming system 206 is stored in the storage data file system 214 of FIG. 2. The data is accessed from the storage data file system 214 for further processing in a transform phase and a load phase for ingestion into the consuming system 206. For example, the consuming system 206 would take the extraction result from the staging data file system 214, as indicated by a read arrow in FIG. 2, and perform further processing.

As described herein, implementations of the present disclosure provide a cloud-native data extraction system that is executable in a PaaS landscape (e.g., Heroku, Cloud Foundry). The data extraction system of the present disclosure functions to extract data from a web service (e.g., REST, OData, network API) into a staging area for further processing in transform and load phases of ETL. That is, and as described herein, data extracted from the source system is stored in the storage data file system. The data extraction system queries the source system in a fault-tolerant manner using multiple queries, as page-level queries, to provide smaller result-sets. The data extraction system persists the query results, each provided as page data from the source system, into the staging area for further transformation and/or loading into the consuming systems. The data extraction system also provisions for horizontal scalability, including coordination between multiple small independent instances of the extraction worker. As also described herein, by using pages as the basic unit of resiliency, only the query of the respective page is re-executed, if a failure in extracting data from the source system occurs.

Figure 10:
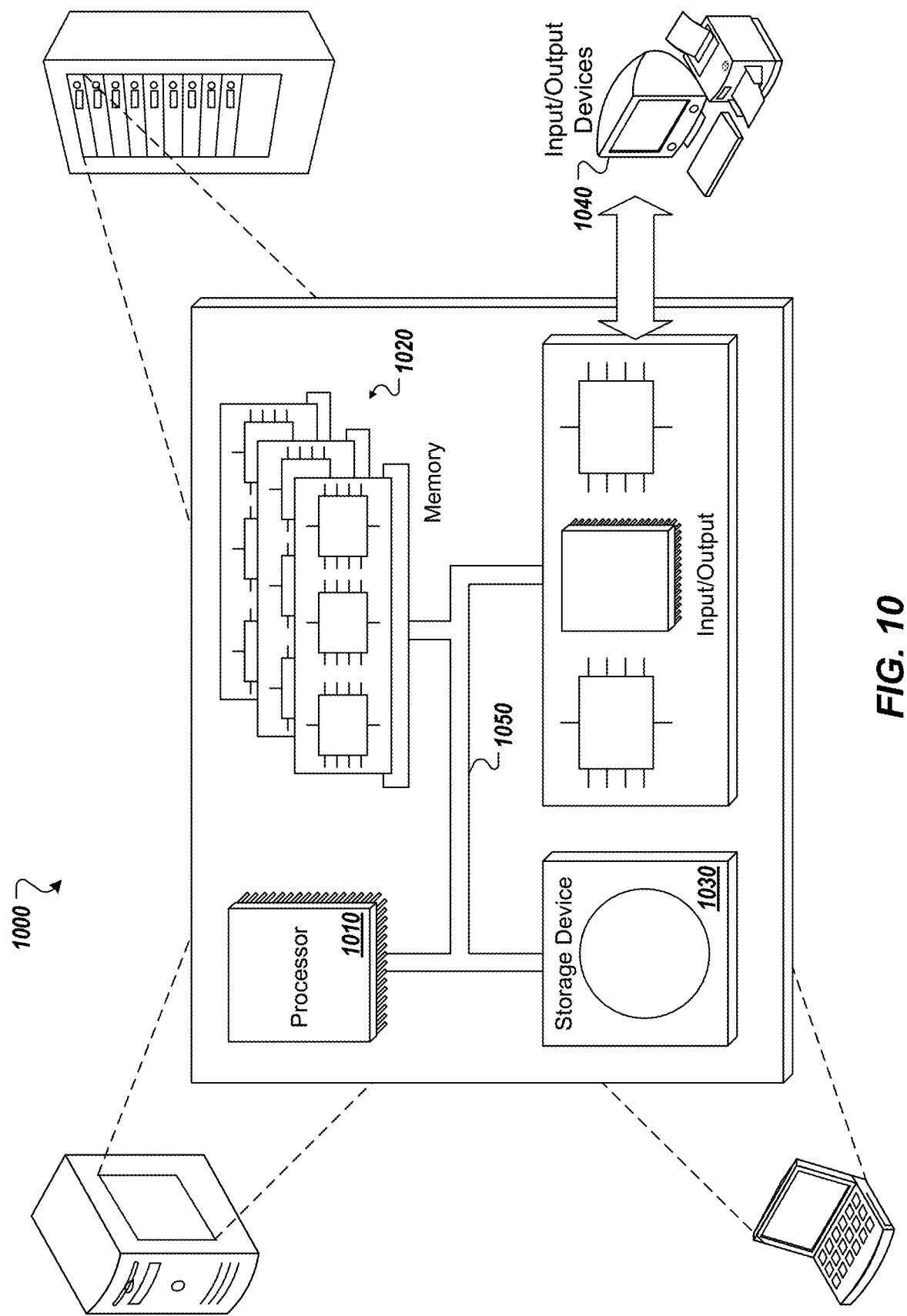
FIG. 10 is a schematic illustration of example computer systems that can be used to execute implementations of the present disclosure.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. The components 1010, 1020, 1030, 1040 are interconnected using a system bus 1050. The processor 1010 is capable of processing instructions for execution within the system 1000. In some implementations, the processor 1010 is a single-threaded processor. In some implementations, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. In some implementations, the memory 1020 is a volatile memory unit. In some implementations, the memory 1020 is a non-volatile memory unit. The storage device 1030 is capable of providing mass storage for the system 1000. In some implementations, the storage device 1030 is a computer-readable medium. In some implementations, the storage device 1030 may be a floppy disk device, a hard disk device, an optical disk device, or a tape device. The input/output device 1040 provides input/output operations for the system 1000. In some implementations, the input/output device 1040 includes a keyboard and/or pointing device. In some implementations, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for extracting data from a source system for transfer to a consuming system, the method being executed by one or more processors and comprising:
   determining, by an extraction worker of a data extraction system, a number of pages based on data that is to be extracted from the source system;
   for each page, by a respective extraction worker:
      querying the source system, and
      storing a query result in a respective page file within a staging data file system of the data extraction system;
   for each extraction worker that queries the source system, verifying a status of the extraction worker after expiration of a predetermined delay time based on a timestamp of the page that the extraction worker is handling; and
   determining that a page status for each page is completed, and in response, posting an extraction completed message to inform the consuming system that the data has been extracted from the source system.

2. The method of claim 1, wherein, for each page, querying the source system is executed in response to posting of an extract page message for each page within the data extraction system.

3. The method of claim 1, further comprising:
   determining that a query failed; and
   determining that a retry count does not exceed a retry count threshold, and in response, again querying the source system using the query.

4. The method of claim 1, further comprising determining that a query succeeded, and in response, setting a page status of a page associated with the query to completed.

5. The method of claim 1, wherein the delay time is set in response to a tally extraction worker request.

6. The method of claim 1, wherein the timestamp is updates in response to a query page status request.

7. The method of claim 6, wherein, in response to the query page status request, an extraction worker determines that a page identified in the query page request is being handled by the extraction worker and updates the timestamp in response.

8. A non-transitory computer-readable storage medium coupled to one or more processors and having instructions stored thereon which, when executed by the one or more processors, cause the one or more processors to perform operations for extracting data from a source system for transfer to a consuming system, the operations comprising:
- determining, by an extraction worker of a data extraction system, a number of pages based on data that is to be extracted from the source system;
- for each page, by a respective extraction worker:
  - querying the source system, and
  - storing a query result in a respective page file within a staging data file system of the data extraction system;
- for each extraction worker that queries the source system, verifying a status of the extraction worker after expiration of a predetermined delay time based on a timestamp of the page that the extraction worker is handling; and
- determining that a page status for each page is completed, and in response, posting an extraction completed message to inform the consuming system that the data has been extracted from the source system.

9. The computer-readable storage medium of claim 8, wherein, for each page, querying the source system is executed in response to posting of an extract page message for each page within the data extraction system.

10. The computer-readable storage medium of claim 8, wherein operations further comprise:
- determining that a query failed; and
- determining that a retry count does not exceed a retry count threshold, and in response, again querying the source system using the query.

11. The computer-readable storage medium of claim 8, wherein operations further comprise determining that a query succeeded, and in response, setting a page status of a page associated with the query to completed.

12. The computer-readable storage medium of claim 8, wherein the delay time is set in response to a tally extraction worker request.

13. The computer-readable storage medium of claim 8, wherein the timestamp is updates in response to a query page status request.

14. The computer-readable storage medium of claim 13, wherein, in response to the query page status request, an extraction worker determines that a page identified in the query page request is being handled by the extraction worker and updates the timestamp in response.

15. A system, comprising:
- a computing device; and
- a computer-readable storage device coupled to the computing device and having instructions stored thereon which, when executed by the computing device, cause the computing device to perform operations for natural language explanations for extracting data from a source system for transfer to a consuming system, the operations comprising:
  - determining, by an extraction worker of a data extraction system, a number of pages based on data that is to be extracted from the source system;
  - for each page, by a respective extraction worker:
    - querying the source system, and
    - storing a query result in a respective page file within a staging data file system of the data extraction system;
  - for each extraction worker that queries the source system, verifying a status of the extraction worker after expiration of a predetermined delay time based on a timestamp of the page that the extraction worker is handling; and
  - determining that a page status for each page is completed, and in response, posting an extraction completed message to inform the consuming system that the data has been extracted from the source system.

16. The system of claim 15, wherein, for each page, querying the source system is executed in response to posting of an extract page message for each page within the data extraction system.

17. The system of claim 15, wherein operations further comprise:
- determining that a query failed; and
- determining that a retry count does not exceed a retry count threshold, and in response, again querying the source system using the query.

18. The system of claim 15, wherein operations further comprise determining that a query succeeded, and in response, setting a page status of a page associated with the query to completed.

19. The system of claim 15, wherein the delay time is set in response to a tally extraction worker request.

20. The system of claim 15, wherein the timestamp is updates in response to a query page status request.

* * * * *